United States Patent
Isenhour et al.

(10) Patent No.: US 9,261,653 B2
(45) Date of Patent: Feb. 16, 2016

(54) FIBER OPTIC PLUG ASSEMBLY AND OPTICAL CONNECTOR SYSTEM

(71) Applicant: Corning Cable Systems LLC, Hickory, NC (US)

(72) Inventors: Micah Colen Isenhour, Lincolnton, NC (US); Dennis Michael Knecht, Hickory, NC (US); James Phillip Luther, Hickory, NC (US)

(73) Assignee: CORNING CABLE SYSTEMS LLC, Hickory, NC (US)

( * ) Notice: Subject to any disclaimer, the term of this patent is extended or adjusted under 35 U.S.C. 154(b) by 170 days.

(21) Appl. No.: 13/849,071

(22) Filed: Mar. 22, 2013

(65) Prior Publication Data

US 2014/0153877 A1 Jun. 5, 2014

Related U.S. Application Data (60) Provisional application No. 61/731,581, filed on Nov. 30, 2012.

(51) Int. Cl.
*G02B 6/38* (2006.01)

(52) U.S. Cl.
CPC ............ *G02B 6/3807* (2013.01); *G02B 6/3847* (2013.01); *G02B 6/3853* (2013.01); *G02B 6/3885* (2013.01); *G02B 6/3893* (2013.01); *G02B 6/3821* (2013.01)

(58) Field of Classification Search
None
See application file for complete search history.

(56) References Cited

U.S. PATENT DOCUMENTS

| | | | | |
|---|---|---|---|---|
| 4,648,665 A * | 3/1987 | Davis et al. | ................... | 439/108 |
| 4,798,430 A * | 1/1989 | Johnson et al. | .................. | 385/78 |
| 4,986,766 A * | 1/1991 | Leonard et al. | ............... | 439/352 |
| 5,462,457 A * | 10/1995 | Schroepfer et al. | ........... | 439/736 |
| 5,486,117 A * | 1/1996 | Chang | .......................... | 439/357 |
| 5,591,050 A * | 1/1997 | Sueoka | ...................... | 439/607.28 |
| 6,056,586 A * | 5/2000 | Lin | .............................. | 439/460 |
| 6,456,768 B1 * | 9/2002 | Boncek et al. | ................. | 385/100 |
| 6,550,979 B1 * | 4/2003 | Fleenor et al. | .................. | 385/78 |
| 6,565,262 B2 | 5/2003 | Childers et al. | ................. | 385/76 |
| 7,232,329 B1 * | 6/2007 | Wu | ................................ | 439/358 |
| 7,695,198 B1 | 4/2010 | Baechtle et al. | ............... | 385/69 |
| 7,704,091 B2 * | 4/2010 | Millan | .......................... | 439/344 |
| 2005/0101176 A1 * | 5/2005 | Kachlic | ......................... | 439/352 |
| 2013/0251315 A1 * | 9/2013 | Isenhour et al. | ................ | 385/93 |
| 2014/0169727 A1 * | 6/2014 | Veatch et al. | .................... | 385/11 |

* cited by examiner

Primary Examiner — Mike Stahl
(74) Attorney, Agent, or Firm — Michael E. Carroll, Jr.

(57) ABSTRACT

A fiber optic plug assembly for a fiber optic cable includes a plug body and cable attachment element. The plug body has a main portion with a front end and back end and at least one latching arm extending from the main portion. The cable attachment element has a front portion received in the back end of the main portion of the plug body, a rear portion located outside of the plug body, and a passage configured to allow at least one optical fiber to extend through the cable attachment element and into the main portion of the plug body. The rear portion of the cable attachment element receives at least a portion of the at least one latching arm. An optical connector system with a fiber optic plug assembly is also provided.

16 Claims, 5 Drawing Sheets

FIBER OPTIC PLUG ASSEMBLY AND OPTICAL CONNECTOR SYSTEM

CROSS-REFERENCE TO RELATED APPLICATIONS

This application claims the benefit of priority under 35 U.S.C. §119 of U.S. Provisional Application Ser. No. 61/731,581 filed on Nov. 30, 2012, the content of which is relied upon and incorporated herein by reference in its entirety.

FIELD

The disclosure relates to generally to fiber optic connectors, and more particularly to fiber optic plug assemblies and optical connector systems including the same.

BACKGROUND

Fiber optic cables include one or more optical fibers that transmit signals in the form of light. The optical fibers provide extremely wide bandwidth, low noise operation, and other well-known benefits.

In a system that uses fiber optic cables, there are typically several locations where the fiber optic cables connect to equipment or other fiber optic cables. The transfer of light at these locations is typically accomplished by optical connector systems that mate one component with another. At least one of the mating components in an optical connector system is often referred to as a "fiber optic connector" (or simply "connector"). For example, connectors are often used in cable management systems to provide service connections to rack-mounted equipment and to provide inter-rack connections.

Many different types of connectors have been developed. As one example of a connector, a MPO-style connector is a multi-fiber connector suitable for high-density backplane and printed circuit board (PCB) applications in data and telecom systems. MPO-style connectors generally utilize adapters, which align the MPO-style connectors with other multi-fiber connectors for forming a connection therebetween.

Connectors are typically designed to not only mate, but also unmate with another component. In other words, the connection is not necessarily intended to be permanent. The parts of a connector may therefore require handling and be exposed to the surrounding environment, including other nearby structures, at some point during the life of the connector. Ensuring that the parts of the connector do not become damaged can be a challenge.

SUMMARY

Embodiments of a fiber optic plug assembly for a fiber optic cable are disclosed herein. The fiber optic plug assembly may be part of an optical connector system, embodiments of which are also disclosed.

According to one embodiment, the fiber optic plug assembly includes a plug body and cable attachment element. The plug body has a main portion with a front end and back end and at least one latching arm extending from the main portion. The cable attachment element has a front portion received in the back end of the main portion of the plug body, a rear portion located outside of the plug body, and a passage configured to allow at least one optical fiber to extend through the cable attachment element and into the main portion of the plug body. The rear portion of the cable attachment element receives at least a portion of the at least one latching arm.

According to another embodiment, the rear portion of the cable attachment element that receives the at least one latching arm comprises a receiving zone that at least partially surrounds a portion of the at least one latching arm. And in a further embodiment, the at least one latching arm has a proximal end attached to the main portion of the plug body and a distal end offset from the main portion. The receiving zone on the rear portion of the cable attachment element at least partially surrounds the distal end of the at least one latching arm. In still further embodiments, the receiving zone on the rear portion of the cable attachment element comprises an opening in which the distal end of the at least one latching arm is positioned. The opening of the receiving zone may extend through the rear portion of the cable attachment element such that the distal end of the at least one latching arm may extend partially or completely through the receiving zone.

According to another embodiment, the plug body further defines a plug body opening at the front end of the main portion and a ferrule enclosure coupled in free space to the plug body opening. A plug ferrule element is disposed within the ferrule enclosure of the plug body and accessible through the plug body opening.

According to yet another embodiment, a fiber optic plug assembly includes a plug body having main portion and at least one latching arm extending from the main portion. The latching arm is movable toward and away from the main portion. The fiber optic plug assembly also includes a cable attachment element coupled to the main portion of the plug body. A portion of the cable attachment element is configured to restrict movement of the latching arm away from the main portion of the plug body. This portion of the cable attachment element may include a flange extending away from the main portion of the plug body and a receiving zone provided on the flange. The receiving zone may include a terminal portion of the flange that extends next to the latching arm on a side of the latching arm opposite the main portion of the plug body. Alternatively or additionally, the receiving zone may at least partially surround a portion of the at least one latching arm.

One embodiment of an optical connector system includes a fiber optic plug assembly according to one of the embodiments above and a fiber optic receptacle assembly for mating with the fiber optic plug assembly. The fiber optic receptacle assembly has a receptacle housing that defines a receptacle enclosure configured to receive the plug body of the fiber optic plug assembly. Additionally, the receptacle housing includes at least one locking mechanism configured to engage the at least one latching arm of the plug body when the plug body is inserted into the receptacle enclosure.

The fiber optic plug assemblies according to the present disclosure have a safe and robust design. With the rear portion of the cable attachment element surrounding at least a portion of the one or more latching arms, the latching arm(s) may be less prone to catching or snagging nearby structures when being handled. Therefore, the latching arm(s) may be less prone to unwanted deformations or breakage. Furthermore, the safe and robust design may be achieved without significantly increasing the complexity of the optical connector system. The advantageous features are conveniently integrated into parts of the fiber optic plug assembly that serve other purposes. This may also be done in a manner that does not significantly increase the overall size of the fiber optic plug assembly or otherwise interfere with the esthetic and/or ergonomic characteristics of the fiber optic plug assembly.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention. In the drawings.

DETAILED DESCRIPTION

Reference will now be made in detail to optical connector systems having fiber optic plug assemblies, examples of which are illustrated in the accompanying drawings. Wherever possible, the same reference numbers will be used throughout the drawings to refer to the same or like parts.

The optical connector systems described herein facilitate the exchange of information over optical fibers. Ends of the optical fibers may be coupled to ends of other optical fibers or to another optical element by the optical connector systems. This may occur at various locations along the path over which the information is sent. The optical connector systems described herein may be, for example, optical data center connector systems. Such optical connector systems typically provide information pathways within data center equipment like racks and cabinets. However, the disclosure is not limited to such applications; other embodiments and applications besides data centers are possible. Furthermore, although the optical connector systems described herein establish the information pathways by mating plug ferrule elements within the fiber optic plug assemblies to receptacle ferrule elements within fiber optic receptacle assemblies, embodiments will be appreciated where the optical connector systems do not use ferrule elements or only use ferrule elements in one of the mating components.

Figure 1:
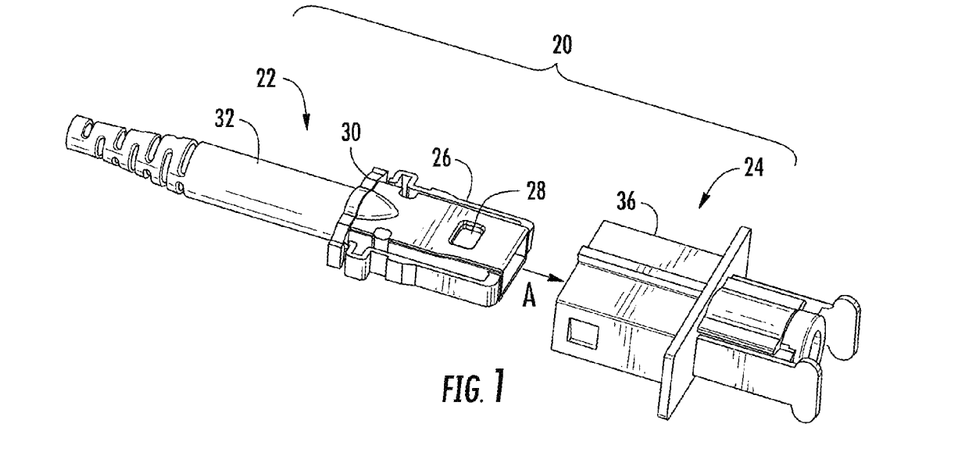
FIG. 1 is a perspective view an optical connector system according to one embodiment including an exemplary fiber optic plug assembly and exemplary fiber optic receptacle assembly in a disconnected state.
Figure 2:
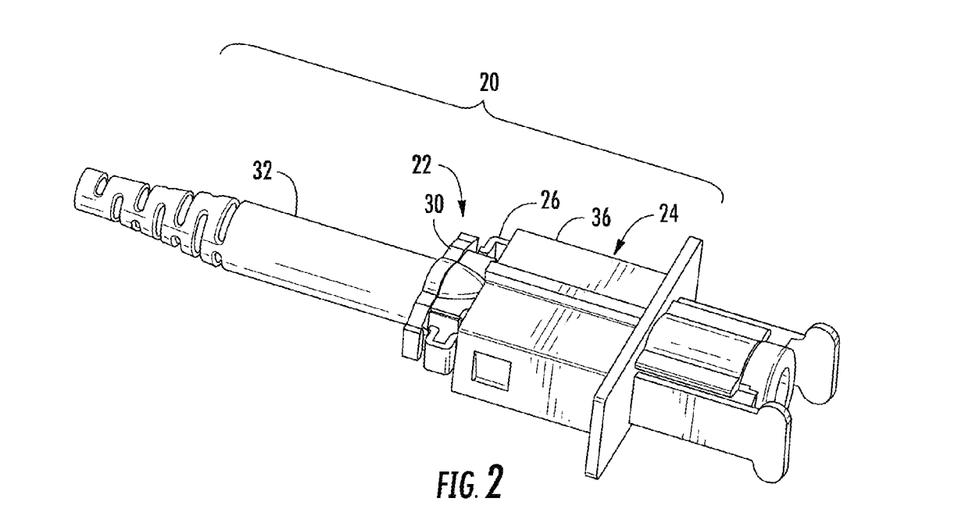
FIG. 2 is a perspective view of the optical connector system shown in FIG. 1 with the fiber optic plug assembly and fiber optic receptacle assembly in a connected state.

With this mind, FIGS. 1 and 2 illustrate an exemplary embodiment of an optical connector system 20 in disconnected and connected states, respectively. The optical connector system 20 includes a fiber optic plug assembly 22 and fiber optic receptacle assembly 24. As will be described in greater detail below, the fiber optic plug assembly 22 includes particular features for improving robustness and facilitating use. First, however, a general description of the assemblies and their connection to each other will be provided.

Figure 3:
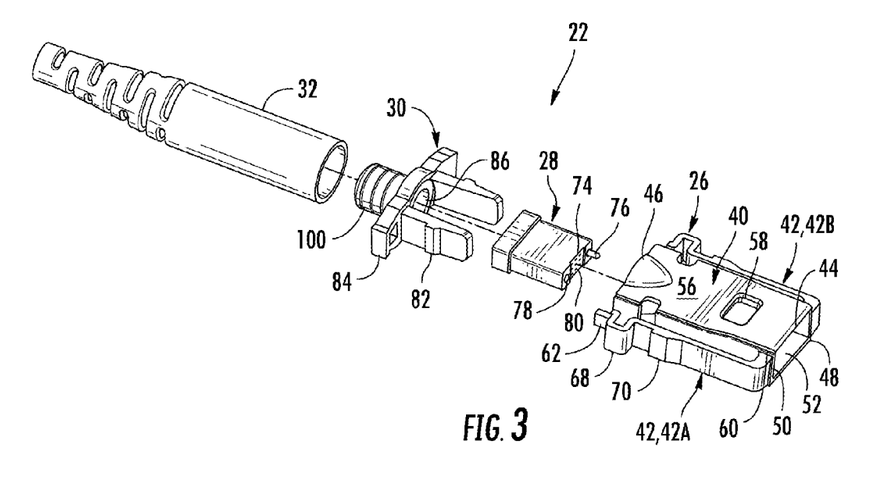
FIG. 3 is an exploded perspective view of the fiber optic plug assembly shown in FIGS. 1 and 2.

In general, and with additional reference to FIG. 3, the fiber optic plug assembly 22 includes a plug body 26, plug ferrule element 28, cable attachment element 30, and optional strain relief element 32. The plug body 26 houses the plug ferrule element 28 and is used to secure the fiber optic plug assembly 22 to the fiber optic receptacle assembly 24. The plug ferrule element 28 is provides an optical interface and thereby allow the transmission of optical signals to a mating component. Persons skilled in the art will appreciate that the optical signals may be delivered by an optical waveguide in a fiber optic cable (not shown) coupled to the fiber optic plug assembly 22. The fiber optic cable may include one or more optical fibers carried within an outer jacket, for example. The cable attachment element 30 is configured to secure the fiber optic plug assembly 22 to the fiber optic cable and allow the optical fibers to extend to the plug ferrule element 28. The strain relief element 32 may also be provided to relieve bending stress and shield or cover the connection between the cable attachment element 30 and fiber optic cable.

Referring to FIGS. 1 and 2, the fiber optic receptacle assembly 24 generally includes a receptacle housing 36 that defines a receptacle enclosure (not numbered in FIGS. 1 and 2) configured to receive the plug body 26 of the fiber optic plug assembly 22. A mating component within the receptacle enclosure communicates with the plug ferrule element 28 to establish an optical connection between the two assemblies. Additional details relating to the optical connection will eventually be described for the particular embodiment shown, but it should be noted that the description is merely provided for illustrative purposes. Optical signals may be transmitted between the plug ferrule element 28 and a mating component in ways other than described below. Indeed, the fiber optic receptacle assembly 24 may be any type of mating connector or adapter configured to cooperate with the plug body 26 of the fiber optic plug assembly 22. The fiber optic receptacle assembly 24 may be provided in a cabinet, rack, or other device of a data center, for example.

Now referring to FIG. 3 in further detail, the plug body 26 of the fiber optic plug assembly 22 includes a main portion 40 and at least one latching arm 42 extending from the main portion 40. First and second latching arms 42A, 42B on opposite sides of the main portion 40 are provided in the embodiment shown. More or fewer latching arms may be provided in alternative embodiments (e.g., an embodiment with a single latching arm will be discussed below in connection with FIGS. 9 and 10). More specifically, the main portion 40 includes a front end 44 and back end 46. The front end 44 defines an insertion surface 48 and plug body opening 50 at the insertion surface. A ferrule enclosure 52 defined by the plug body 26 is in communication with or otherwise coupled in free space to the plug body opening 50. The plug ferrule element 28 is disposed in the ferrule enclosure 52 when the fiber optic plug assembly 22 is assembled (see FIG. 1). The back end 46 of the main portion 40 of the plug body 26 may also include an opening (not numbered) to which the ferrule enclosure 52 is coupled. Accordingly, the ferrule enclosure 52 may form a passage through the main portion 40 of the plug body 26.

In the illustrated embodiment, an outer surface of the plug body 26 (e.g., a top surface 56 of the main portion 40) includes an opening 58 providing access to the plug ferrule element 28 when the plug ferrule element 28 is disposed in the ferrule enclosure 52. In some embodiments, an adhesive may be applied into the opening 58 to secure the plug ferrule element 28 to the plug body 26. In other embodiments, no such opening 58 is provided.

The latching arms 42 each have a proximal end 60 attached to the main portion 40 of the plug body 26 and a distal end 62 offset (i.e., spaced) from the main portion 40. Although the proximal ends 60 are shown as being attached proximate the insertion surface 48, in alternative embodiments the latching arms 42 may be attached elsewhere to the main portion 40 of the plug body 26. The latching arms 42 each include a projecting portion (not numbered) extending in a direction generally perpendicular to an outer surface of the main portion 40 and/or parallel to the plane of the insertion surface 48. A latching portion (not numbered) extends in a rearward direction from the projecting portion and ultimately defines the distal ends 62 of the latching arms 42. The overall configuration is such that the latching arms 42 are compliant in a direction transverse to the insertion direction A (FIG. 1). Release tabs 68 may be provided on the latching arms 42. Applying force the release tabs 68 or inserting the fiber optic plug assembly 22 into a suitable receptacle (such as the receptacle housing 36) results in the latching arms 42 moving toward the main portion 40 of the plug body 26. The latching arms 42 may also include a locking mechanism, such as a detent 70, between the proximal and distal ends 60, 62 for reasons that will be apparent based on the description below.

As mentioned above, the plug body 26 houses the plug ferrule element 28 within the plug ferrule enclosure 52. In the illustrated embodiment, the plug ferrule element 28 has a front face 74 that defines one or more mechanical coupling surfaces and an optical interface surface (neither surface is numbered in the figures). The optical interface surface may or may not be flush with the mechanical coupling surface(s). An alignment feature, such an alignment pin 76 or alignment bore 78, may be provided on some or all of the mechanical coupling surface(s). The alignment feature(s) are configured to engage corresponding features on the component to which the plug ferrule element 28 mates when the fiber optic plug assembly 22 is inserted into the fiber optic receptacle assembly 24. However, any suitable alignment features are possible for mating complementary ferrule elements.

To establish an optical connection, the optical interface surface may comprise a plurality of lens elements 80 configured to be optically coupled to a plurality of optical fibers (not shown). The optical fibers are received and aligned by the plug ferrule element 28 when a fiber optic cable is connected to the fiber optic plug assembly 22. Such an arrangement is described in U.S. Provisional Patent Application No. 61/731, 581 ("the '581 application"). This type of connection, however, is merely an example. Persons skilled in the art will appreciate that features pertaining to other components of the fiber optic plug assembly 22 (e.g., the plug body 26 and cable attachment element 30) may be used in connection with plug ferrule elements having different designs. For example, the plug ferrule element 28 may be designed to optically couple the fiber optic plug assembly 22 to a mating component without the use of lens elements. Even further, the concepts disclosed for the fiber optic plug assembly 22 may be designed to couple to a mating component without using any ferrule element.

Figure 4:
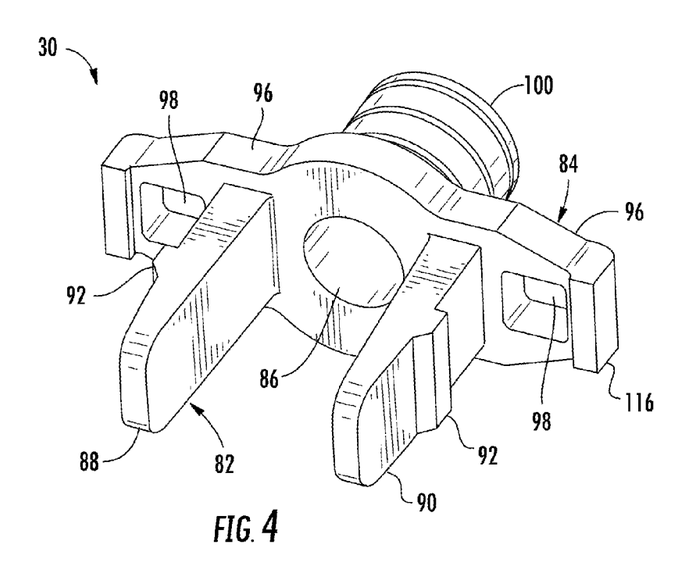
FIG. 4 is a perspective view of a cable attachment element that is part of the fiber optic plug assembly shown in FIGS. 1-3.

Now referring to FIGS. 3 and 4, the cable attachment element 30 includes a front portion 82 configured to engage the plug body 26, a rear portion 84 from which the front portion 82 extends, and a passage 86 configured to allow one or more optical fibers from a fiber optic cable to extend through the cable attachment element 30. The front portion 82 is defined by first and second attachment prongs 88, 90 in the illustrated embodiment, with each attachment prong including at least one latching element 92 (shown as a detent). The rear portion 84 includes one or more flanges or yokes 96 extending in a generally radial direction (i.e., generally transverse to the axis of the passage 86). One or more receiving areas 98 may be provided in the rear portion 84 for reasons that will be discussed below. The cable attachment element 30 may also include an extending or ridged portion 100 that extends in a rearward direction from the rear portion 84. The extending portion 100 is configured to engage the strain relief element 32.

Figure 5:
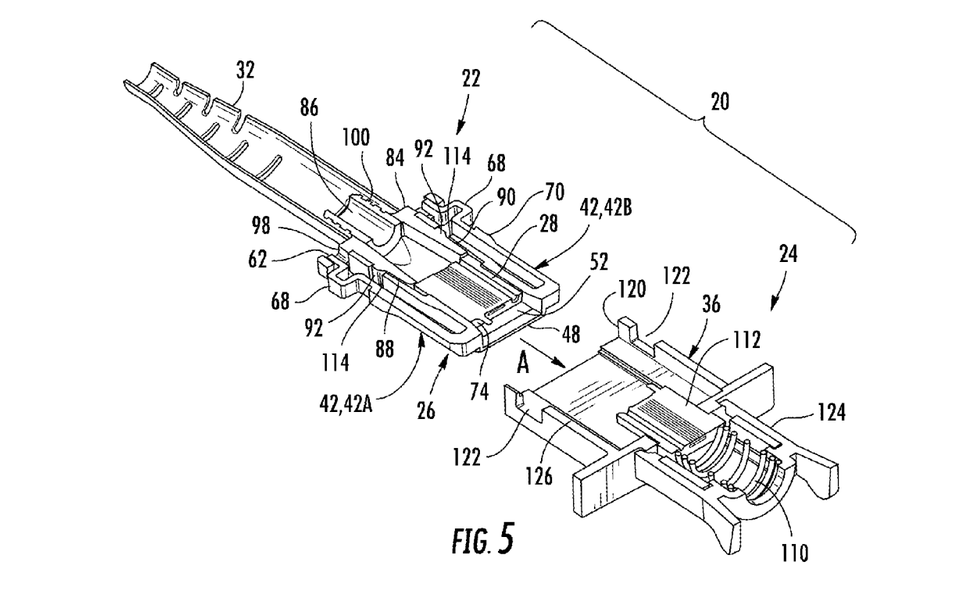
FIG. 5 is a cross-sectional perspective view of the optical connector system shown in FIGS. 1 and 2 with the fiber optic plug assembly and the fiber optic receptacle assembly in a disconnected state.
Figure 6:
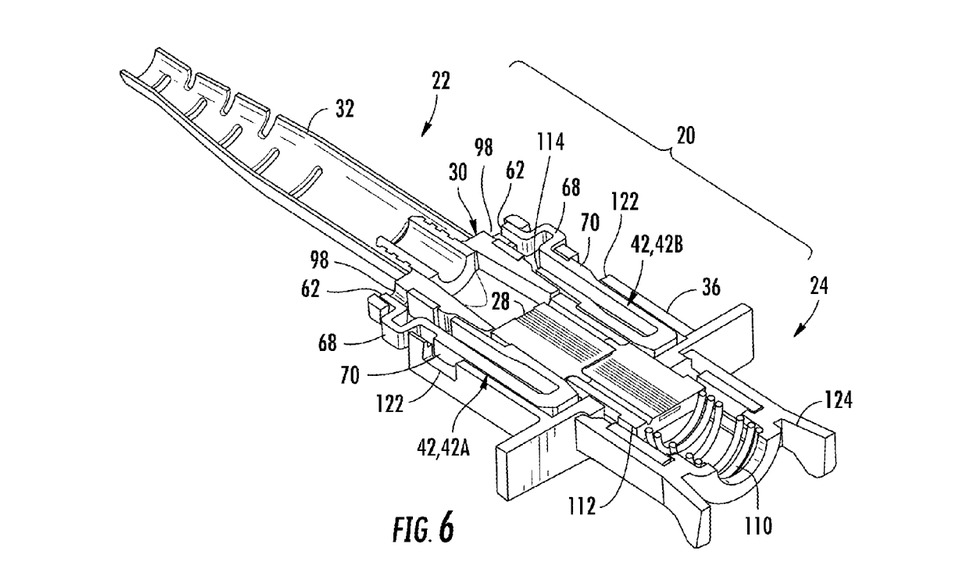
FIG. 6 is a cross-sectional perspective view of the optical connector system shown in FIGS. 1 and 2 with the fiber optic plug assembly and the fiber optic receptacle assembly in a connected state.

FIG. 5 illustrates the fiber optic plug assembly 22 in an assembled state but disconnected from the fiber optic receptacle assembly 24 (also shown in an assembled state in FIG. 5). FIG. 6 is similar but illustrates the fiber optic plug assembly 22 and fiber optic receptacle assembly 24 connected together. The figures are illustrated in cross-section so that the components of the assemblies and can be seen in further detail.

As shown in FIGS. 5 and 6, the plug ferrule element 28 is disposed in the ferrule enclosure 52 of the plug body 26 such that the front face 74 of the plug ferrule element 28 is offset (e.g., recessed rearward) from the insertion surface 48 of the plug body 22. Having the plug ferrule element 28 recessed within the plug body 26 protects the lens elements 80 of the plug ferrule element 28 from mechanical damage or inadvertent contamination but still allows cleaning. The plug ferrule element 28 may be retained in the ferrule enclosure 52 by providing appropriate features (e.g., ridges) on interior walls of the plug body 26. The plug ferrule element 28 may also be configured to float (i.e., move slightly in a direction transverse to insertion direction A) within the ferrule enclosure 52 to aid in finely aligning the plug ferrule element 28 during connection to a mating component. These and other aspects are described in further detail in the '581 application mentioned above. Again, however, the embodiment shown is merely an example and other plug ferrule element designs and interactions with a plug body will be appreciated by persons skilled in the art.

It is noted that a bias member (e.g., one or more springs) is not provided within the ferrule enclosure 52 in the illustrated embodiment. As described below, a bias member 110 is provided in the fiber optic receptacle assembly 24. The bias member 110 maintains the plug ferrule element 28 and a receptacle ferrule element 112 in an optically-coupled relationship when the two ferrule elements are mated together. In alternative embodiments, however, one or more bias members may be provided in the plug body 26 as desired.

At least one of the interior walls of the plug body 26 includes an attachment element 114 configured to engage a corresponding latching element 92 on the front portion 82 of the cable attachment element 30. In the embodiment shown, opposite interior walls of the plug body 26 include attachment elements 114 in the form of openings or windows. As mentioned above, the first and second attachment prongs 88, 90 of the cable attachment element 30 include respective latching elements 92 in the form of detents. When the first and second attachment prongs 88, 90 are inserted in the back end 46 of the plug body 26, the detents 92 engage the openings 114 to secure the cable attachment element 30 to the plug body 26. The openings 144 need not completely extend through the interior walls of the plug body 24 in alternative embodiments.

Inserting the front portion 82 of the cable attachment element 30 in the back end 46 of the plug body 26 also brings the rear portion 84 of the cable attachment element 30 into a position that shields/captivates the latching arms 42 of the plug body 26. More specifically, and with reference to FIGS. 7 and 8, the rear portion 84 remains located outside of the main portion 40 of the plug body 26. The flanges 96 on the rear portion 84 receive at least a portion of the latching arms 42. The manner in which this occurs may vary, but generally the arrangement is such that a portion of each flange 96 is located on a side of the latching arm 42 opposite the main portion 40 of the plug body 26. For example, a portion of each flange 96 may be offset from the main portion 40 of the plug body 26 (and/or insertion direction A) by a greater extent than the portion of the latching arm 42 being received. This portion of each flange 96 may extend over, around, or otherwise next to the latching arm 42 when the latching arm 42 is received. The arrangement may be such that the outward over-extension or movement of the latching 42 away from the main portion 40 of the plug body is in some way confined, restricted, or limited.

In the embodiment shown, a receiving zone 98 is provided in each flange 96 for receiving the distal ends 62 of the latching arms 42. The receiving zones 98 are shown in the form of pockets or openings that completely surround the distal ends 62 of the latching arms 42, although embodiments where pockets or openings only partially surround the distal ends 62 are also possible. The receiving zones 98 may have any shape so long as they accommodate the distal ends 62 of the latching arms 42. The receiving zones 98 are also shaped such that the latching arms 42 remain compliant in a direction transverse to the insertion direction A (FIGS. 1 and 5). In other words, there is sufficient space to move the distal ends 62 in the receiving zones 98 toward and/or away from the main portion 40 of the plug body 26. The distal ends 62 of the latching arms 42 may extend through the receiving zones 98 and slightly beyond the flanges 96 or may terminate within the receiving zones 98. Accordingly, in alternative embodiments the receiving zones 98 may be openings or pockets with a bottom surface (e.g., cups or recesses) such that the receiving zones 98 do not extend through the flanges 96.

Figures 7, 8A:
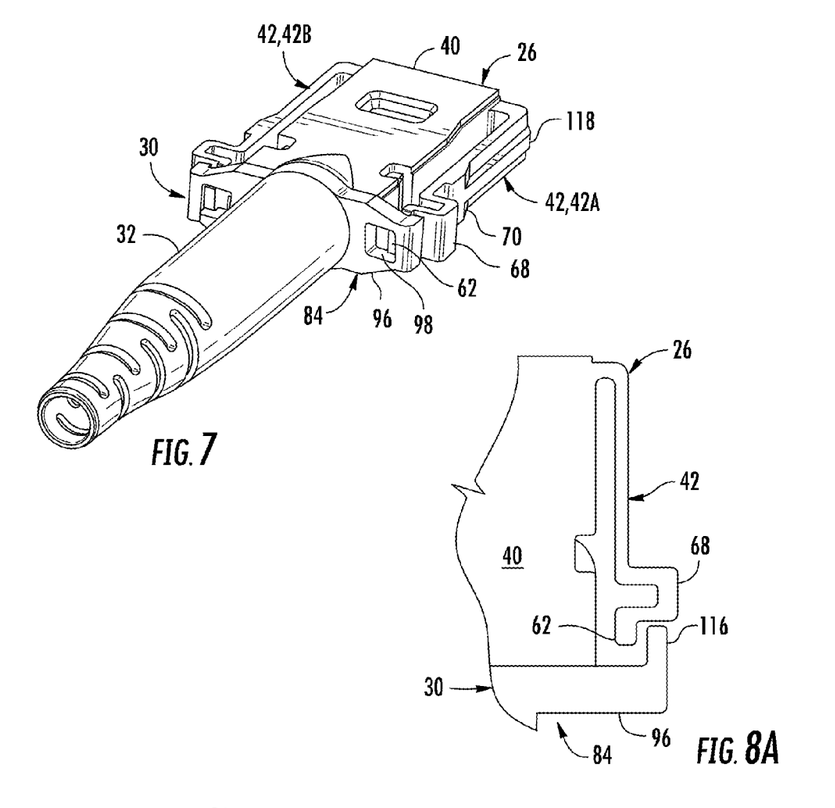
FIG. 7 is a perspective view of the fiber optic plug assembly shown in the preceding figures wherein the fiber optic plug assembly is shown in isolation and from a different angle.
FIG. 8A is a schematic view of a portion of a fiber optic plug assembly according to an alternative embodiment.
Figure 8:
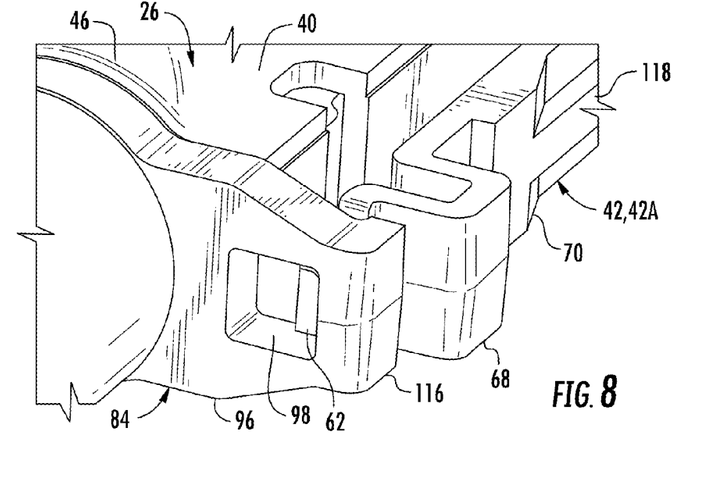
FIG. 8 is an enlarged perspective view of a portion of the fiber optic plug assembly shown in FIG. 7 depicting an exemplary latching arm and receiving zone.

It will also be appreciated that the rear portion 84 of the cable attachment element 30 may shield or protect the latching arms 42 without the use of pockets or openings. For example, in alternative embodiments the flanges 96 may simply confront (and possibly abut) the distal ends 62 of the latching arms 42. FIG. 8A is a schematic illustration of this type of arrangement. Even if the latching arms 42 are shorter in such embodiments, a terminal portion 116 of each flange 96 may extend forward, generally parallel to the insertion direction A (FIGS. 1 and 5) such that the flanges 96 would still receive the distal ends 62 of the latching arms 42. The terminal portions 116 may serve as receiving zones that prevent the distal ends 62 from moving outwardly (i.e., away from the main portion 40 of the plug body 26) beyond a certain extent. Terminal portions 116 are also shown in the embodiment of FIGS. 7 and 8 to illustrate that different types of receiving zones may be provided in the same embodiment (e.g., pockets 98 and terminal portions 116).

The latching arms 42 may be configured such that no movement toward the main portion 40 of the plug body 26 is required in order to be received by the rear portion 84 of the cable attachment element 30. In other words, it may not be necessary to squeeze or push the latching arms 42 inwards while inserting the cable attachment element 30 into the back end 46 of the plug body 26 so that a portion of each latching arm 42 (e.g., the distal end 62) can be located between the main portion 40 of the plug body 26 and the portion of the cable attachment element 30 that receives the latching arm 42 (e.g., the receiving zones 98 and/or terminal portion 116). Some clearance or space may remain between the cable attachment element 30 and latching arm 42 that not only allows inward movement toward the main portion 40 of the plug body 26 (as discussed above in connection with the receiving zones 98), but also outward movement. Eventually, however, contact with the portion of the cable attachment element 30 that receives the latching arm 42 restricts or delimits movement of the latching arm 42 away from the main portion 40 of the plug body 26.

In alternative embodiments, the latching arms 42 may be configured such that inward movement is required. In other words, it may be necessary to squeeze or push the latching arms 42 inwards while inserting the cable attachment element 30 into the back end 46 of the plug body 26 so that a portion of each latching arm 42 (e.g., the distal end 62) can be located between the main portion 40 of the plug body 26 and the portion of the cable attachment element 30 that receives the latching arm 42 (e.g., the receiving zones 98 and/or terminal portion 116). This may be accomplished by applying force to the release tabs 68, for example. The force may be released once the latching arms 42 are received by the cable attachment element 30. If the latching arms 42 are resilient, they then may move back outward until contact is made with the cable attachment element 30. Any internal spring force/resiliency remaining may help maintain this contact.

Persons skilled in the art will appreciate various additional features for the above-described embodiments. For example, regardless of whether the latching arms 42 must be moved inward during insertion of the cable attachment element 30 into the back end 46 of the plug body 26, the rear portion 84 of the cable attachment element 30 may include a ramp or some other lead-in feature (not shown) to help guide the latching arms 42 into a position where the rear portion 84 can receive the latching arms 42. Even in embodiments not requiring inward movement of the latching arms 42 under normal circumstances, such a lead-in feature may still be advantages in case the latching arms 42 are somehow pushed slightly outward or deformed (thereby representing a deviation from normal circumstances).

FIGS. 7 and 8 also illustrate how the first latching arm 42A may include a keying feature 118. The keying feature 118 helps ensure proper alignment when the fiber optic plug assembly 22 is inserted into the fiber optic receptacle assembly 24, which may include a corresponding keying feature (not shown) for this purpose. Keying features for other purposes (e.g., security) may also be provided on the latching arms 42 or elsewhere on the plug body 26.

Referring back to FIGS. 5 and 6, the configuration of the plug body 26 is such that it mates with the receptacle housing 36 of the fiber optic receptacle assembly 24. The plug body 26 is inserted into the receptacle housing 36 through a receptacle opening 120. The detents 70 of the latching arms 42 may be ramped to facilitate the latching arms 42 deflecting inwards when the detents 70 contact walls of the receptacle housing 36 that define edges of the receptacle opening 120. This allows the plug body 26 to be inserted further into the receptacle housing 36. Eventually the detents 70 engage corresponding locking mechanisms on the receptacle housing 36. In the embodiment shown, the locking mechanisms are lock openings or windows 122 in opposed walls of the receptacle housing 36. The lock openings 122 are large enough to accommodate the detents 70 such that the latching arms 42 of the plug body 26 can move away from the main portion 40 of the plug body 26, back toward a non-deflected position. This brings rear surfaces of the detents 70 into a position that helps prevent withdrawal of the plug body 26 from the receptacle housing 36. Specifically, the detents 70 are shaped to engage the lock openings 122 upon attempted withdrawal. Thus, the engagement between the detents 70 and lock openings 122 helps secure the fiber optic plug assembly 22 to the fiber optic receptacle assembly 24.

It should be noted that the fiber optic receptacle assembly 24 is shown as further comprising a receptacle the bias member 110 and receptacle ferrule element 112 mentioned above, along with a clip member 124. The receptacle ferrule element 112 is disposed within a receptacle enclosure 126 defined by the receptacle housing 36 and is the mating component to which the plug ferrule element 28 is optically coupled when the fiber optic plug assembly 22 is secured to the fiber optic receptacle assembly 24. To this end, and consistent with the statements above, the receptacle ferrule element 112 is only shown for illustrative purposes and will not be described in detail. Reference can be made to the '581 application (mentioned above) for a better understanding of such an embodiment. The same applies to a description of the bias member 110 and clip member 124.

To remove the fiber optic plug assembly 22 from the fiber optic receptacle assembly 24, a user may apply force to the release tabs 68 of the latching arms 42 to move the detents 70 away from the lock openings 122. Such movement is permitted despite the distal ends 62 of the latching arms 42 being positioned within the receiving zones 98, as mentioned above. The fiber optic plug assembly 22 may then be pulled out of the fiber optic receptacle assembly 24.

During withdrawal or general handling of the fiber optic plug assembly 22, the latching arms 42 remain positioned within the receiving zones 98. The receiving zones 98 surrounding the distal ends 62 help prevent the latching arms 42 from catching or snagging other components/structures in the surrounding environment (not illustrated in the figures). To this end, the chances of the latching arms 42 being bent, twisted, or otherwise deformed, or even broken in part or snapped off from the main portion 40 of the plug body 26, are reduced or eliminated. Thus, a safer and more robust design is provided by shielding/protecting the latching arms 42 in this manner.

Advantageously, the robust design inhibits damage and is achieved without significantly increasing the complexity of the optical connector system 20. The shielding of the latching arms 42 is integrated into the rear portion 84 of the cable attachment element 30. No additional components are necessary. Nor are any modifications to the fiber optic receptacle assembly 24 or other component to which the fiber optic plug assembly 22 is intended to mate necessary. Furthermore, the rear portion 84 of the cable attachment element 30 may be designed to not project outwardly (i.e., generally transverse to insertion direction A) further than the outermost portions of the latching arms 42 (the release tabs 68 in the embodiment shown). The overall profile of the fiber optic plug assembly 22 may therefore be maintained despite incorporating the shielding/captivating features described above. Thus, an esthetic and ergonomic design may still be provided. This is particularly advantageous for fiber optic plug assemblies designed for high fiber counts in that the plug ferrule elements and plug bodies for such assemblies may already be relatively wide to accommodate a large number of optical fibers.

Figure 9:
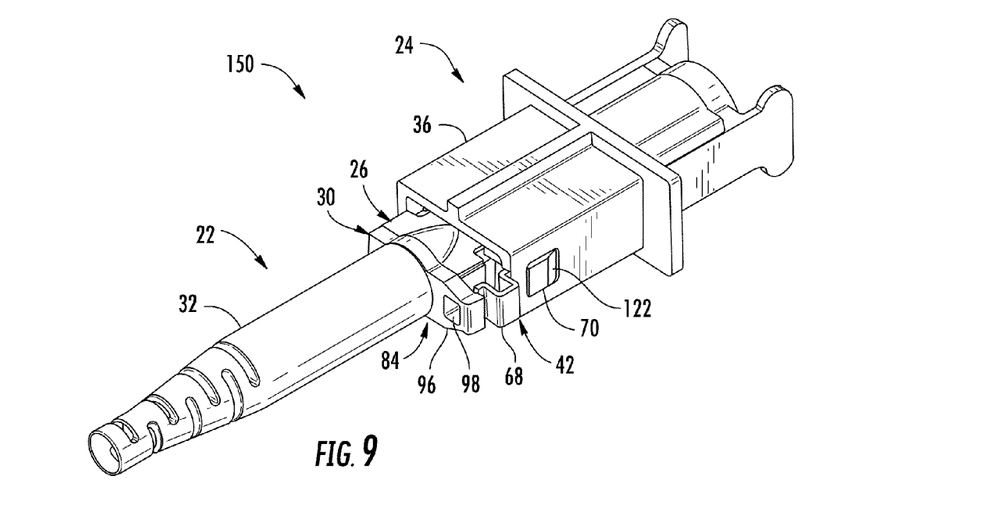
FIG. 9 is a perspective view of an alternative embodiment of an optical connector system including an exemplary a fiber optic plug assembly and an exemplary fiber optic receptacle assembly in a connected state.
Figure 10:
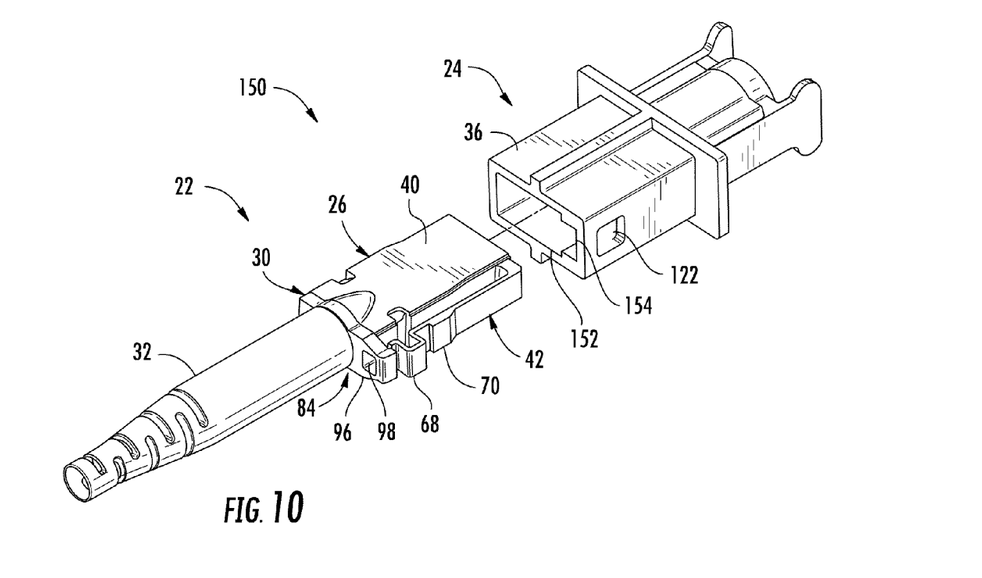
FIG. 10 is a perspective view of the optical connector system shown in FIG. 9 wherein the fiber optic plug assembly and the fiber optic receptacle assembly are in a disconnected state.

FIGS. 9 and 10 illustrate an optical connector system 150 according to an alternative embodiment in disconnected and connected states, respectively. The optical connector system 150 is similar to optical connector system 20 in most respects, and the same reference numbers are used in the figures to refer to corresponding elements. In the optical connector system 150, only a single latching arm 42 is provided on the plug body 26 of the fiber optic plug assembly 22. The rear portion 84 of the cable attachment element 30 may therefore include only a single flange 96 and receiving zone 98, if desired. Additionally, a corresponding modification may be made to the fiber optic receptacle assembly 24, i.e. the receptacle housing 36 may only have a single lock opening 122 for cooperating with the detent 70 on the latching arm 42 of the plug body 26. The latching arm 42 operates in the same manner as in the previously discussed embodiment, with the rear portion 84 shielding/captivating the distal end 62 of the latching arm 42 to help prevent catching or snagging. Thus, the advantages described above remain equally applicable. Providing a single latching arm 42 has the additional advantage of being able to serve as a keying feature for alignment and/or security. In particular, the receptacle housing 36 may have a receptacle opening 152 with a groove or cutout 154 in a wall extending from the receptacle opening 152. The groove or cutout 154 has a shape corresponding to the latching arm 42 so that the plug body 26 of the fiber optic plug assembly 22 may only be inserted into the receptacle housing 36 with the proper orientation (i.e., the latching arm 42 being aligned with the groove or cutout 154 in the receptacle housing 36).

Another modification embodied by the optical connector system 150 is that the main portion 40 of the plug body 26 does not include an opening on an outer surface to provide access to the plug ferrule element 28.

Many additional modifications, regardless of whether such modifications relate to the safety features mentioned above, will be readily apparent to persons of ordinary skill in the art to which this disclosure relates. Thus, persons of ordinary skill in the art will appreciate additional embodiments and examples when having the benefit of the teachings presented in the above description and the associated drawings. These additional embodiments and examples are intended to be covered by the present disclosure provided that they come within the scope of the appended claims and their equivalents.

What is claimed is:

1. A fiber optic plug assembly for a fiber optic cable having at least one optical fiber, the fiber optic plug assembly comprising:
    a plug body having a main portion and at least one latching arm extending from the main portion, wherein the at least one latching arm comprises a proximal end attached to the main portion and a distal end offset from the main portion, and wherein the main portion has a front end and back end; and
    a cable attachment element having a front portion received in the back end of the main portion of the plug body, a rear portion located outside of the plug body, and a passage configured to allow the at least one optical fiber to extend through the cable attachment element and into the main portion of the plug body, wherein the rear portion of the cable attachment element receives at least a portion of the at least one latching arm and comprises a receiving zone that at least partially surrounds the distal end of the at least one latching arm, and wherein the receiving zone comprises an opening in which the distal end of the at least one latching arm is positioned.

2. The fiber optic plug assembly of claim 1, wherein the opening of the receiving zone extends through the rear portion of the cable attachment element, and further wherein the distal end of the at least one latching arm extends partially or completely through the opening of the receiving zone.

3. The fiber optic plug assembly of claim 1, wherein the at least one latching arm is positioned parallel to an insertion direction of the fiber optic plug assembly.

4. The fiber optic plug assembly of claim 3, wherein the at least one latching arm is compliant in a direction transverse to the insertion direction.

5. The fiber optic plug assembly of claim 1, wherein the at least one latching arm comprises a detent.

6. The fiber optic plug assembly of claim 1, wherein the at least one latching arm comprises a keying feature.

7. The fiber optic plug assembly of claim 1, wherein first and second latching arms are positioned on opposite sides of the main portion of the plug body.

8. The fiber optic plug assembly of claim 1, wherein the plug body further defines a plug body opening at the front end of the main portion and a ferrule enclosure coupled in free space to the plug body opening, the fiber optic plug assembly further comprising:
a plug ferrule element disposed within the ferrule enclosure of the plug body and accessible through the plug body opening.

9. The fiber optic plug assembly of claim 8, wherein the cable attachment element is coupled to the plug body at a rear opening of the plug body that is opposite from the plug body opening, and further wherein the ferrule enclosure is coupled in free space to the rear opening such that the front portion of the cable attachment element extends into the ferrule enclosure.

10. The fiber optic plug assembly of claim 1, further comprising a strain relief element disposed about the cable attachment element.

11. The fiber optic plug assembly of claim 10, wherein the cable attachment element further comprises a ridged portion extending rearwardly from the rear portion for engaging the strain relief element.

12. The fiber optic plug assembly of claim 1, wherein the front portion of the cable attachment element comprises at least one latching element configured to engage an attachment element on the main portion of the plug body.

13. The fiber optic plug assembly of claim 12, wherein the at least one latching element on the front portion of the cable attachment element comprises at least one attachment prong.

14. An optical connector system, comprising:
a fiber optic plug assembly for a fiber optic cable having at least one optical fiber, the fiber optic plug assembly comprising:
a plug body having a main portion and at least one latching arm extending from the main portion, wherein the main portion has a front end and back end, and wherein the plug body further defines a plug body opening at a front end of the main portion and a ferrule enclosure coupled in free space to the plug body opening;
a plug ferrule element disposed within the ferrule enclosure of the plug body and accessible through the plug body opening; and
a cable attachment element having a front portion received in the back end of the main portion of the plug body, a rear portion located outside of the plug body, and a passage configured to allow the at least one optical fiber to extend through the cable attachment element and into the main portion of the plug body, wherein the rear portion of the cable attachment element receives at least a portion of the at least one latching arm; and
a fiber optic receptacle assembly comprising a receptacle housing that defines a receptacle enclosure configured to receive the plug body of the fiber optic plug assembly, wherein the receptacle housing includes at least one locking mechanism configured to engage the at least one latching arm of the plug body when the plug body is inserted into the receptacle enclosure.

15. The optical connector system of claim 14, wherein the at least one latching arm of the plug body comprises a detent and the at least one locking mechanism of the receptacle housing comprises at least one lock opening configured to cooperate with the detent.

16. The optical connector system of claim 14, wherein the fiber optic receptacle assembly further comprises a receptacle ferrule element disposed within the receptacle enclosure and configured to mate with the plug ferrule element.

* * * * *